(12) United States Patent
Akatsu et al.

(10) Patent No.: US 7,969,460 B2
(45) Date of Patent: Jun. 28, 2011

(54) OPTICAL SCANNING DEVICE AND IMAGE FORMING APPARATUS

(75) Inventors: Kazuhiro Akatsu, Ibaraki (JP); Yasuyuki Shibayama, Ibaraki (JP); Takeshi Mochizuki, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 31 days.

(21) Appl. No.: 12/489,728

(22) Filed: Jun. 23, 2009

(65) Prior Publication Data

US 2009/0317137 A1  Dec. 24, 2009

(30) Foreign Application Priority Data

Jun. 23, 2008 (JP) ................................. 2008-163549

(51) Int. Cl.
*B41J 15/14* (2006.01)
*B41J 27/00* (2006.01)
(52) U.S. Cl. ........................ 347/244; 347/258
(58) Field of Classification Search .................. 347/230, 347/241–244, 256–261
See application file for complete search history.

(56) References Cited

U.S. PATENT DOCUMENTS

| | | | | |
|---|---|---|---|---|
| 4,906,061 A | * | 3/1990 | Yamaguchi | 359/206.1 |
| 4,932,734 A | * | 6/1990 | Sakuma et al. | 359/207.1 |
| 5,808,774 A | * | 9/1998 | Kawabata | 359/210.1 |
| 7,142,339 B2 | * | 11/2006 | Tomioka | 359/196.1 |
| 2007/0296800 A1 | | 12/2007 | Akatsu et al. | |

FOREIGN PATENT DOCUMENTS

| | | |
|---|---|---|
| JP | 60-121412 | 6/1985 |
| JP | 63-189822 | 8/1988 |
| JP | 5-273463 | 10/1993 |
| JP | 3034648 | 2/2000 |
| JP | 2001-343606 | 12/2001 |
| JP | 2002-267976 | 9/2002 |
| JP | 2003-315709 | 11/2003 |
| JP | 2008-89746 | 4/2008 |

OTHER PUBLICATIONS

U.S. Appl. No. 12/474,511, filed May 29, 2009, Akatsu.
Japanese Office Action issued on Mar. 29, 2011, in counterpart Japanese Patent Application No. 2006-171140 (5 pages).

* cited by examiner

*Primary Examiner* — Hai C Pham
(74) *Attorney, Agent, or Firm* — Oblon, Spivak, McClelland, Maier & Neustadt, L.L.P.

(57) ABSTRACT

Disclosed is an optical scanning device including a light source including multiple light-emitting elements, the multiple light-emitting elements being arranged in a linear manner, a collimator lens to collimate a light beam from the light source, a light-deflecting device to deflect a light beam having passed through the collimator lens to a medium to be scanned and scan the medium with the light beam, and a rear optical system arranged in an optical path between the collimator lens and the medium to be scanned, wherein the collimator lens deviates an image surface in a direction opposite to an image surface deviation on the medium to be scanned by a nearly same amount as the image surface deviation, the image surface deviation being caused by a change of an image height of the light source, and the change being caused by the rear optical system.

8 Claims, 18 Drawing Sheets

FIG.6

| No | Name | Radius of Curvature | Radius of Curvature in Main-Scanning Direction | Radius of Curvature in Sub-Scanning Direction | Thickness | Refractive Index |
|---|---|---|---|---|---|---|
| 1 | EX1 | 85.63 | - | - | 4 | 1.514 |
| 2 | EX1 | -85.63 | - | - | 439.5 | 1 |
| 3 | EX2 | ∞ | - | - | 4 | 1.514 |
| 4 | EX2 | -184.7 | - | - | 217.2 | 1 |
| 5 | CYL | - | - | 73.10 | 4 | 1.514 |
| 6 | CYL | - | - | ∞ | 140.3 | 1 |
| 7 | POL(mirror) | - | - | - | 145 | 1 |
| 8 | Fθ1 | -694.2 | - | - | 21 | 1.615 |
| 9 | Fθ1 | -186.6 | - | - | 10 | 1 |
| 10 | Fθ2 | -187.8 | - | - | 12 | 1.796 |
| 11 | Fθ2 | -493.3 | - | - | 26.11 | 1 |
| 12 | Fθ3 | ∞ | - | - | 30 | 1.635 |
| 13 | Fθ3(toric) | - | -318.3 | -145 | 12 | 1 |
| 14 | Fθ4 | - | - | 167.4 | 10 | 1.514 |
| 15 | Fθ4 | - | - | ∞ | 12 | 1 |
| 16 | Fθ5 | 586.5 | - | - | 3.5 | 1.528 |
| 17 | Fθ5 | 643.1 | - | - | 478.8 | 1 |

OPTICAL SCANNING DEVICE AND IMAGE FORMING APPARATUS

BACKGROUND OF THE INVENTION

1. Field of the Invention

The present invention relates to an optical scanning device and an image forming apparatus.

2. Description of the Related Art

When optical scanning with a high printing dot density is conducted by an optical scanning system with a wide scanning width, it may be necessary to increase the width of an incident beam into a scanning lens (third optical system) in order to provide a small scanning spot diameter corresponding to a dot density. An incident beam width L is generally represented by formula 1:

$$L = 4 \times \lambda \times f/(\pi \times \phi) \quad \text{(formula 1)},$$

wherein $\lambda$, f, and $\phi$ are a used wavelength, the focal length of a scanning lens, and a scanning spot diameter, respectively.

If the wavelength, the focal length of a scanning lens, and the scanning spot diameter are, for example, 660 nm, 500 mm, and 40 μm, respectively, the incident beam width L is 10.5 mm according to the above-described formula 1. Because the aperture diameter of a collimator lens (first optical system) having been used conventionally is commonly about 7 mm and it may be impossible to emit a wide beam of 10.5 mm, a second optical system such as a beam expander for expanding a light beam behind a collimator lens is required.

The second optical system may be essential for an optical scanning device with plural light sources, because the effect of crossing beams from plural light sources at the position of a rotary polygon mirror is also provided. If this second optical system is not provided, the space between plural light beams having passed through a first optical system is increased and has a width larger than the width of a single beam at the position of a rotary polygon mirror. In that case, it may be impossible to scan a required scanning range with sufficient amount of light unless the inscribed circle radius of the rotary polygon mirror is increased, and there may be a limit to increasing of the inscribed circle radius of the rotary polygon mirror, which may be problematic.

Meanwhile, when optical scanning is conducted with a high printing dot density, there may be a limit to the rotational frequencies of light-deflecting means such as a rotary polygon mirror, and therefore, it may be necessary to increase the number of light sources. The rotational frequency R of a rotary polygon mirror is represented by formula 2:

$$R = D \times V/(n \times m) \quad \text{(formula 2)},$$

wherein D, V, m, and n are a printing dot density, a process speed, the number of mirror planes of light-deflecting means, and the number of plural beams, respectively.

If the printing dot density, the process speed, the number of mirror planes of light-deflecting means, and the number of beams are 1200 dpi, 70 inches/second, 8, and 20, respectively, the rotational frequency R is 31500 revolutions per minute, which is a practical rotational frequency.

Furthermore, when optical scanning is conducted with a high printing dot density, there may be a limit to bema modulation, and therefore, it may be increase the number of light sources. A time period per 1 dot, T, is represented by formula 3:

$$T = n \times m/(F \times D \times D \times V) \quad \text{(formula 3)},$$

wherein D, V, f, m, and n are a printing dot density, a process speed, the focal length of a scanning lens (third optical system), the number of mirror planes of light-deflecting means, and the number of beams, respectively.

If the printing dot density, the process speed, the focal length of a scanning lens (third optical system), the number of mirror planes of light-deflecting means, and the number of beams are, for example, 1200 dpi, 70 inches/second, 500 mm, 8, and 40, respectively, the time period per 1 dot, T, is 12.8 ns, which is a modulatable value. Therefore, it may be required that the number of beams is 40 or more in the specification of the above-described example.

Next, in regard to arrangement of light-emitting elements, for example, 40 light-emitting elements are arranged in a line and their arrangement angles are changed, whereby it may be possible to adjust a scanning interval, which may be preferable. Herein, if the space between the light-emitting elements is, for example, 20 μm, the length of the arrangement is 780 μm and the image height of a light source in the first optical system which is up to about ±0.4 mm will be used.

Conventionally, when the printing dot density is, for example, 600 dpi for the same specification as the above-described example, it may have been sufficient for the number of beams to be 10 due to the restriction on the time period per 1 dot, T, and therefore, it may have been sufficient for the image height of a light source to be about ±0.1 mm. In this case, if the focal length of the first optical system is, for example, 17 mm, the angle of emission from the first optical system of a light source at the end thereof is 0.337 degrees and a light beam from the light source passes comparatively near the optical axis thereof, so that aberration caused by the first and second (lens systems for shaping a light beam) and third (scanning lens system for imaging on a medium to be scanned) optical systems may be sufficiently small and may not be problematic.

However, if the image height of a used light source is 4 times, that is, ±0.4 mm and the focal length of the first optical system is 17 mm similarly to the above-described example, the angle of emission of a light-emitting element at the end thereof is 1.35 degrees and a light beam from the light-emitting element is displaced from the optical axis thereof, so that lens aberrations cased by the first, second and third optical systems, in particular, an image surface deviation may be problematic.

In order to solve it, it may be necessary to correct for lenses constituting the second and third optical systems. However, some characteristics such as a constant speed of scanning and an image position for each scanning position are taken into consideration for a set of the second and third optical systems, and therefore, it may not be easy to include an item for improving the characteristics of an image surface deviation associated with the image height of a light source. Furthermore, when correction is conducted by an aspheric lens in the second and third optical systems, the size of the lens may be so large that it may be difficult to realize an aspheric lens or a large cost increase may be involved for its realization, which may not be practical.

For a solution concerning the above-described aberrations, for example, in Japanese Patent Application Publication No. 05-273463, a single aspheric and glass lens is used as a collimator lens that is a first optical system and combined with an optical scanning and imaging system that is composed of a plastic only whereby a performance change caused by a temperature change is corrected for.

For a solution concerning the above-described aberrations, for example, in Japanese Patent Application Publication No. 2002-267976, one optical element that has an axial power of about 0 and an aspheric shape is arranged between a coupling lens system and light-deflecting means in order to suppress a spherical aberration generated in the case where the numerical aperture NA of an optical system is large and provide an optical scanning device that is adaptable for attaining a high dot density of a recording medium at a low price.

For a solution concerning the above-described aberrations, for example, in Japanese Patent Application Publication No. 60-121412, a single aspheric lens is provided which has a numerical aperture NA of 0.12-0.2 and both well-corrected spherical aberration and sine condition.

For a solution concerning the above-described aberrations, for example, in Japanese Patent Application Publication No. 63-189822, positive and negative cylindrical lenses are provided between a light source and light-deflecting means so that a spherical aberration possessed by a deflecting lens is corrected for.

As described above, some kinds of single aspheric and glass lens have been suggested conventionally but not all of the problems have been solved. That is, in the suggestions in Japanese Patent Application Publication No. 05-273463, Japanese Patent Application Publication No. 2002-267976, Japanese Patent Application Publication No. 60-121412, and Japanese Patent Application Publication No. 63-189822, as described above, an image surface deviation associated with the image height of a light source has not been taken into consideration and there has been a problem such that the deviation of light spots may be large in the case where a large number of light-emitting elements are arranged in a liner manner and the image height of a light source is large. Furthermore, if such an optical scanning device is used for an image forming apparatus, there may be a disadvantage such that a line width may not be uniform whereby an image may be unstable and degradation of an image quality may be caused.

SUMMARY OF THE INVENTION

According to one aspect of the present invention, there is provided an optical scanning device including a light source including multiple light-emitting elements, the multiple light-emitting elements being arranged in a linear manner, a collimator lens configured to collimate a light beam from the light source, a light-deflecting device configured to deflect a light beam having passed through the collimator lens to a medium to be scanned and scan the medium to be scanned with the light beam, and a rear optical system arranged in an optical path between the collimator lens and the medium to be scanned, wherein the collimator lens is configured to deviate an image surface in a direction opposite to an image surface deviation on the medium to be scanned by a nearly same amount as the image surface deviation, the image surface deviation being caused by a change of an image height of the light source, and the change of an image height being caused by the rear optical system.

According to another aspect of the present invention, there is provided an image forming apparatus including a photoconductor body, a charging device configured to charge the photoconductor body, an optical scanning device configured to scan the photoconductor body with a light ray and form an electrostatic latent image on the photoconductor body, the electrostatic latent image corresponding to image information to be recorded, a development device configured to provide a toner to the electrostatic latent image to form a toner image, a transfer device configured to transfer the toner image onto the medium to be recorded, and a fixation device configured to fix the transferred toner image on the medium to be recorded, wherein the optical scanning device is the optical scanning device as described above.

BRIEF DESCRIPTION OF THE DRAWINGS

FIG. 6 is a diagram illustrating a specific example of the structures of second and third optical systems in the first embodiment.

DETAILED DESCRIPTION OF THE PREFERRED EMBODIMENTS

Figure 1:
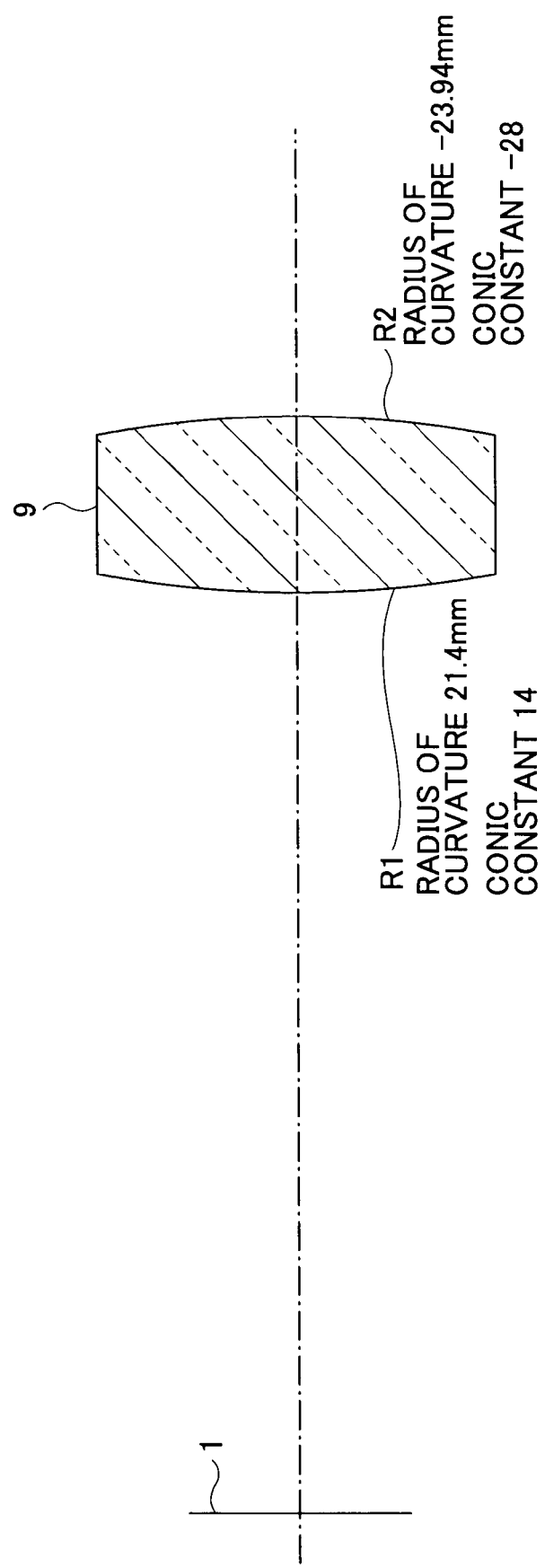
FIG. 1 is an enlarged cross-sectional diagram of a collimator lens according to a first embodiment of the present invention.

At least one illustrative embodiment of the present invention may relate to an optical scanning optical system, an optical scanning device, and an image forming apparatus using the same.

At least one illustrative embodiment of the present invention may relate to an optical scanning optical system and optical scanning device to be installed in an image forming apparatus such as a digital copying machine or a laser printer or the like, and an image forming apparatus using the same, and in particular, relates to an optical scanning optical system and optical scanning device with a collimation optical system for collimating a light beam from a light source.

One object of at least one illustrative embodiment of the present invention may be to solve the disadvantage of at least one of the conventional techniques as described above or to provide an optical scanning optical system and optical scanning device, in which, even if multiple light-emitting elements are arranged in a linear manner and the image height of a light source at a peripheral part is large, it may be possible to image light beams from all of the light-emitting elements on a medium to be scanned, and an image forming apparatus using the same.

Another object of at least one illustrative embodiment of the present invention may be to provide a light source device in which even if multiple light sources are arranged in a linear manner and an image height of a light source at a peripheral part is large, it may be possible to image focuses of light beams from all of the light sources on a medium to be scanned.

In order to achieve the above-described object, a first illustrative embodiment of the present invention is an optical scanning optical system having a light source in which multiple light-emitting elements are arranged in a linear manner, a collimator lens for collimating a light beam from the light source, light-deflecting means for deflecting a light beam having passed through the collimator lens to a medium to be scanned for scanning thereof, and a rear optical system arranged in an optical path between the collimator lens and the medium to be scanned, wherein the optical scanning optical system is characterized in that the collimator lens is a lens in which an image surface is deviated in a direction opposite to an image surface deviation on the medium to be scanned due to a change of an image height of the light source which is caused by the rear optical system, by a nearly same amount as the image surface deviation.

A second illustrative embodiment of the present invention is the first illustrative embodiment, wherein the optical scanning optical system is characterized in that the rear optical system includes a shaping optical system arranged in an optical path between the collimator lens and the light-deflecting means to shape a light beam collimated by the collimator lens, and an imaging optical system arranged in an optical path between the light-deflecting means and the medium to be scanned to image a light beam deflected for scanning by the light-deflecting means onto the medium to be scanned.

A third illustrative embodiment of the present invention is the first or second illustrative embodiment, wherein the optical scanning optical system is characterized in that a numerical aperture of the collimator lens is controlled to be 0.08 or less.

A fourth illustrative embodiment of the present invention is any of the first to third illustrative embodiments, wherein the optical scanning optical system is characterized in that the light source is a light source in which multiple light-emitting elements are arranged in a line.

A fifth illustrative embodiment of the present invention is the fourth illustrative embodiment, wherein the optical scanning optical system is characterized in that the light source is rotatable while an optical axis of the light source is a central axis thereof and a scanning interval of a light ray is adjusted by rotation of the light source.

A sixth illustrative embodiment of the present invention is an optical scanning device having a light source in which multiple light-emitting elements are arranged in a linear manner, a collimator lens for collimating a light beam from the light source, light-deflecting means for deflecting a light beam having passed through the collimator lens to a medium to be scanned for scanning thereof, and a rear optical system arranged in an optical path between the collimator lens and the medium to be scanned, wherein the optical scanning optical system is characterized in that the collimator lens is a lens in which an image surface is deviated in a direction opposite to an image surface deviation on the medium to be scanned due to a change of an image height of the light source which is caused by the rear optical system, by a nearly same amount as the image surface deviation.

A seventh illustrative embodiment of the present invention is the sixth illustrative embodiment, wherein the optical scanning device is characterized in that the rear optical system includes a shaping optical system arranged in an optical path between the collimator lens and the light-deflecting means to shape a light beam collimated by the collimator lens, and an imaging optical system arranged in an optical path between the light-deflecting means and the medium to be scanned to image a light beam deflected for scanning by the light-deflecting means onto the medium to be scanned.

An eighth illustrative embodiment of the present invention is the sixth or seventh illustrative embodiment, wherein the optical scanning device is characterized in that a numerical aperture of the collimator lens is controlled to be 0.08 or less.

A ninth illustrative embodiment of the present invention is any of the sixth to eighth illustrative embodiments, wherein the optical scanning device is characterized in that the light source is a light source in which multiple light-emitting elements are arranged in a line.

A tenth illustrative embodiment of the present invention is the ninth illustrative embodiment, wherein the optical scanning device is characterized in that the light source is rotatable while an optical axis of the light source is a central axis thereof and a scanning interval of a light ray is adjusted by rotation of the light source.

An eleventh illustrative embodiment of the present invention is an image forming apparatus with a photoconductor body, a charging device for charging the photoconductor body, an optical scanning device for forming on the photoconductor body an electrostatic latent image corresponding to image information to be recorded by means of scanning a light ray, a development device for providing attachment of a toner to the electrostatic latent image to form a toner image, a transfer device for transferring the toner image onto the medium to be recorded, and a fixation device for fixing the transferred toner image on the medium to be recorded, wherein the image forming apparatus is characterized in that the optical scanning device is the optical scanning device of any of the sixth to tenth illustrative embodiments.

According to at least one illustrative embodiment of the present invention, it may be possible to an optical scanning optical system and optical scanning device in which it may be possible to provide a nearly same position of focuses of both a light ray from a light-emitting element away from an optical axis thereof and a light ray from a light-emitting element on the optical axis and it may be possible to conduct light scanning on a condition such that deviation of light spots is small.

Furthermore, it may be possible to provide an image forming apparatus with the optical scanning device whereby a line width is uniform and an image is stable, so that it may be possible to obtain a high quality image.

Next, some practical examples of the present invention will be described with reference to the drawings, below.

First Practical Example

Figure 2:
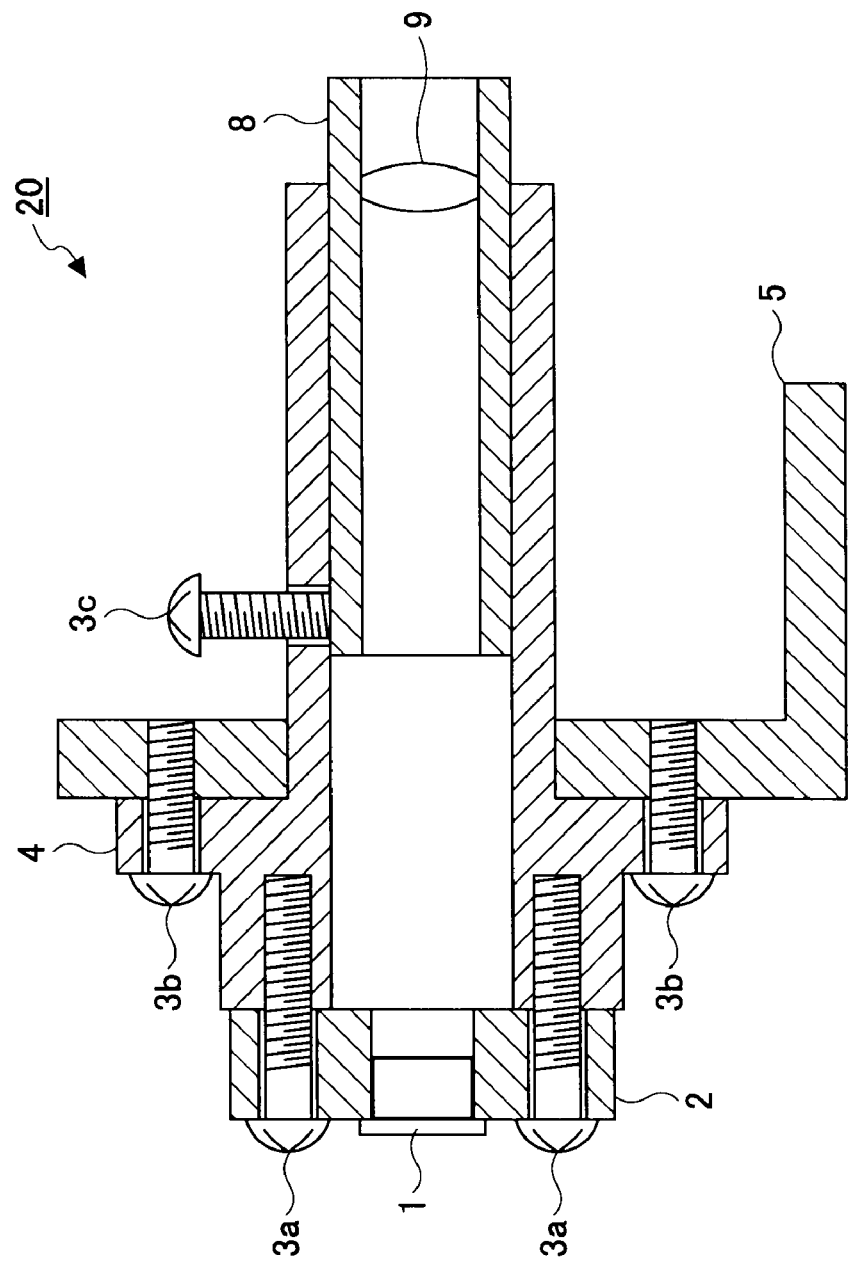
FIG. 2 is a cross-sectional diagram of a light source device mounted with the collimator lens.
Figure 3:
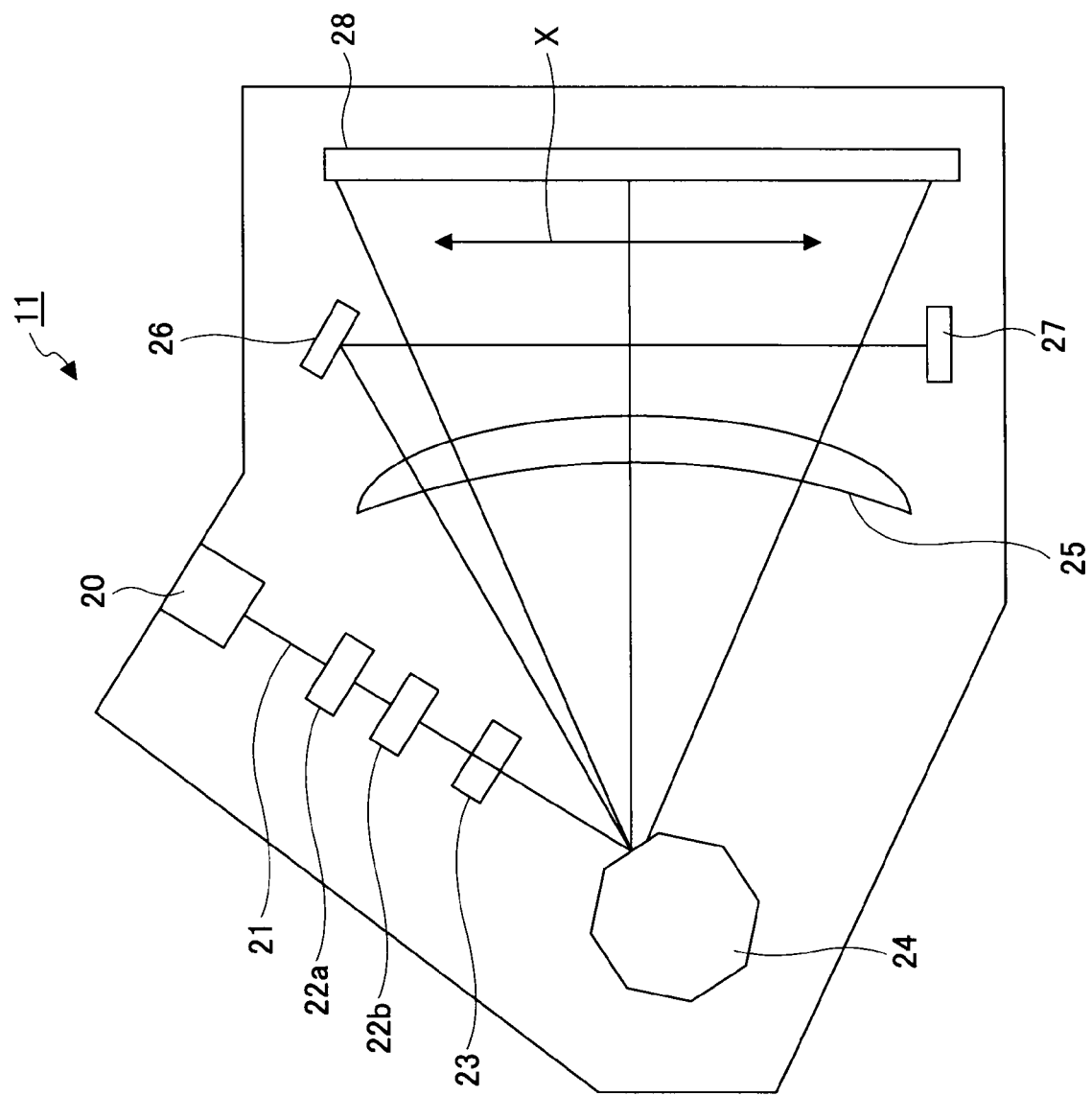
FIG. 3 is a schematic structural diagram of an optical scanning device using the light source device.

A first practical example of the present invention will be described with reference to FIG. 1-FIG. 4. FIG. 1 is an enlarged cross-sectional diagram of a collimator lens according to the present practical example; FIG. 2 is a cross-sectional diagram of a light source device mounted with the collimator lens; FIG. 3 is a schematic structural diagram of an optical scanning device using the light source device; and FIG. 4 is a schematic structural diagram of an image forming apparatus using the optical scanning device.

Figure 4:
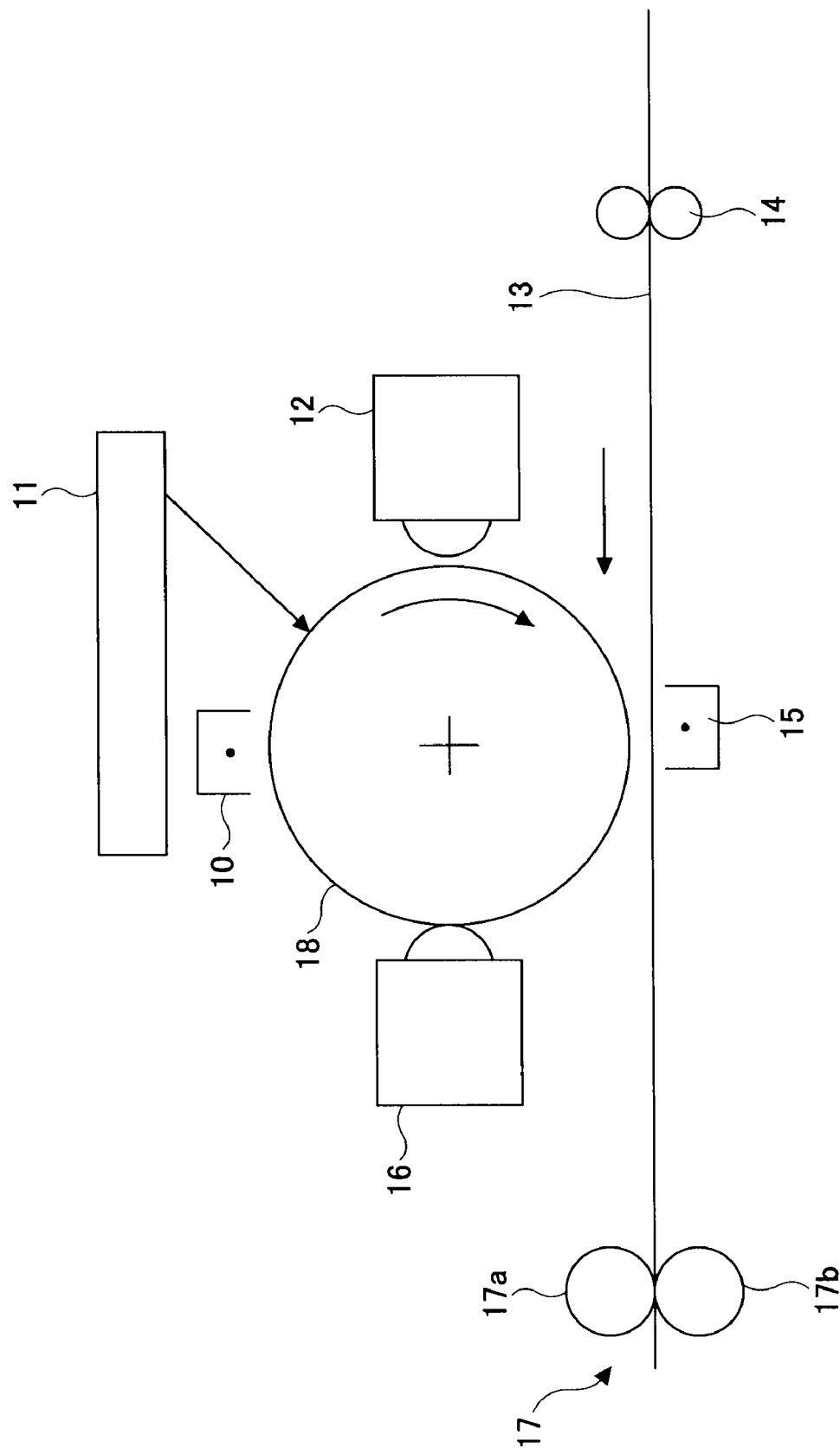
FIG. 4 is a schematic structural diagram of an image forming apparatus using the optical scanning device.

First, the structure of an image forming apparatus according to a practical example of the present invention is described schematically in FIG. 4. A drum-shaped photoconductor body 18 for forming a toner image is rotated at a constant circumferential speed in a clockwise direction when facing to the drawing, by a motor that is not illustrated in the figure.

After the surface of the photoconductor body 18 is uniformly charged at a particular polarity by a charging device 10, its light exposure is conducted by means of light rays from an optical scanning device 11 and an electrostatic latent image corresponding to image information to be recorded is formed. A development device 12 is arranged at the downstream side of the rotation direction of the photoconductor body at the position of the light exposure and the electrostatic latent image on the photoconductor body 18 is developed by the development device 12 so as to form a toner image.

A printing paper sheet 13 that is a medium to be recorded is conveyed by a conveyer device 14 such as a conveyer roller pair. Subsequently, charging with a polarity opposite to that of a toner is conduced on the back face of the printing paper sheet 13 by a transfer device 15 and the toner image on the photoconductor body 18 is transferred onto the printing paper sheet 13. After the transfer, a residual toner on the photoconductor body 18 which toner has not been transferred is removed by a cleaning device 16 and prepared for the next image formation process.

The printing paper sheet 13 onto which the toner image has been transferred from the photoconductor body 18 is conveyed to a fixation device 17. The fixation device 17 is composed of a heat roller 17a that is heated and controlled at a constant temperature and a pressurizing roller 17b pressed to and contacting it. When passing through between the heat roller 17a and the pressurizing roller 17b, the toner image held on the printing paper sheet 13 is pressurized, melted and fixed on the printing paper sheet 13. After the fixation process, the printing paper sheet 13 is ejected to the outside of the image forming apparatus and stocked.

FIG. 3 is a schematic structural diagram illustrating an internal structure of the above-described optical scanning device 11. A light ray 21 emitted from a light source device 20 passes through beam expanders 22a, 22b composed of two lenses, is shaped into a predetermined beam width, passes through a cylindrical lens 23 having a predetermined curvature in only a sub-scanning direction, is deflected for scanning by a rotary polygon mirror 24, passes through an Fθ lens 25, is reflected by a folding mirror 28, and is imaged on the photoconductor body 18 that is not illustrated in the figure, so that an electrical latent image is created.

The X direction of an arrow in the figure indicates a light scanning direction (main-scanning direction). Additionally, a part of a light ray deflected for scanning is introduced into a light sensor 27 via a mirror 26 and modulation of a light ray 21 emitting from the above-described light source device 20 is conducted by means of its signal.

While a light source 1 (see FIG. 2) is provided in the above-described light source device 20, multiple (40 in the present practical example) light-emitting elements are arranged in a line in the light source 1, and therefore, light spots are arranged on the photoconductor body 18.

Figure 5:
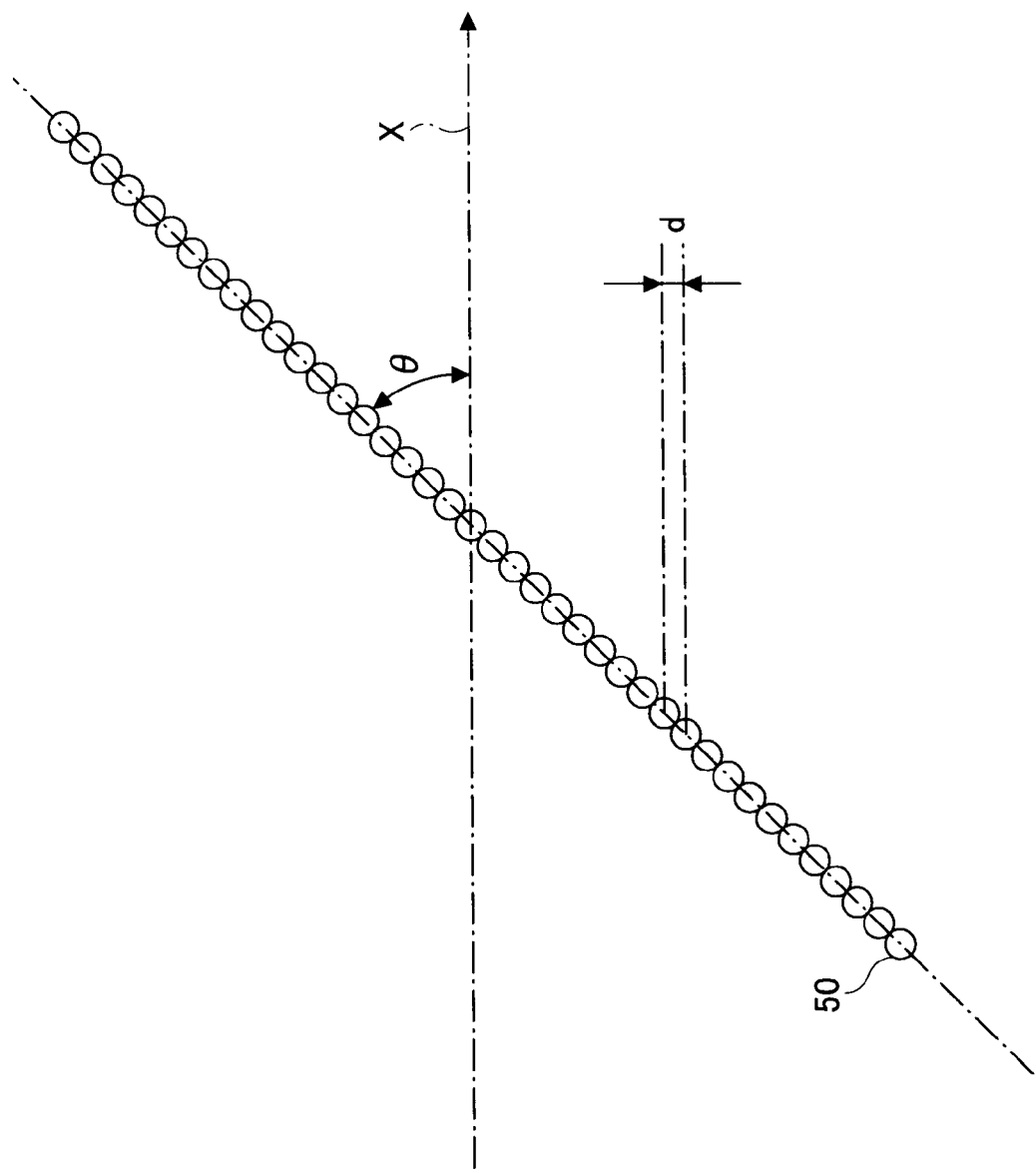
FIG. 5 is diagram illustrating the situation where a number of light spots are arranged on a medium to be scanned in the first embodiment.

FIG. 5 illustrates the situation where 40 light spots 50 are arranged on the photoconductor body 18. As the light source 1 is rotated around its optical axis as a central one, the arrangement angle θ of light spots 50 on the photoconductor body 18 is changed, and accordingly, the scanning interval of a light ray is also changed, whereby it may be possible to adjust the scanning interval d of the light ray by changing the above-described arrangement angle θ.

As illustrated in FIG. 2, the above-described light source device 20 is mainly composed of a light source 1, a light source holder 2, a collimator lens 9 that is a first optical system mounted in a body tube 8, and a body tube holder 4.

The light source 1 is fixed in the light source holder 2 by means of welding or a screw (that is not illustrated in the figure). The body tube 8 is fixed by striking a screw 3c after its distance from the light source 1 is adjusted appropriately. The light source holder 2 and the body tube holder 4 are integrated by means of a screw 3a after their positioning in a direction perpendicular to an optical axis, and fixed on a base 5 by means of a screw 3b.

Herein, on the condition that a unit of the light source holder 2 holding the light source 1 and the body tube holder 4 has been inserted into the base 5, the arrangement angle θ of spots on the above-described photoconductor body is changed by rotating the entire of the unit around the optical axis of the light source 1 as a central axis so that the scanning interval d is adjusted to an appropriate value. After the adjustment, the above-mentioned unit is positioned at and fixed on the base 5 by means of a screw 3b. In order to allow a rotational adjustment of the above-described unit, a screw hole at the side of the holder 4, through which the above-described screw 3b is inserted, is a long hole.

The present practical example is characterized in that a first optical system is used whose numerical aperture NA is 0.08 or less and whose image surface is deviated to a direction opposite to an image surface deviation on a medium to be scanned (the photoconductor body in the present practical example) due to a change of the image height of the light source which is caused by second and third optical systems, by a nearly same amount as the above-described image surface deviation.

For illustrating such an example, FIG. 6 illustrates a specific example of the structures of the second and third optical systems. The unit of each item of a radius of curvature and a thickness in the figure is mm. Furthermore, EX1 and EX2 in the figure are expander lenses and correspond to the beam expander lenses 22a and 22b in FIG. 3. CYL in FIG. 6 is a cylindrical lens and corresponds to the cylindrical lens 23 in FIG. 3. POL in FIG. 6 is a rotary polygon mirror and corresponds to the rotary polygon mirror 24 in FIG. 3. Fθ1-Fθ5 in FIG. 6 are Fθ lenses, correspond to the Fθ lens 25 in FIG. 3 and are composed of 5 ones Fθ1-Fθ5 in the present practical example. In the present practical example, the expander lenses EX1 and EX2 constitute the second optical system and the lenses Fθ1-Fθ5 constitute the third optical system.

The radius of curvature of EX1 for No. 1 in the figure indicates a radius of curvature of the beam expander lens 22a at the side of the entrance face thereof. The thickness of EX1 for No. 1 indicates the thickness of the beam expander lens 22a along the optical axis thereof. The refractive index of EX1 for No. 1 indicates the refractive index of the beam expander lens 22a, per se.

The radius of curvature of EX1 for No. 2 in the figure indicates the radius of curvature of the beam expander lens 22a at the side of exit face thereof. The thickness of EX1 for No. 2 is the thickness of a layer provided between the beam expander lens 22a and the adjacent beam expander lens 22b and indicates that the space between the beam expander lens 22a and the beam expander lens 22b is 439.5 mm in the present practical example. The refractive index of EX1 for No. 2 indicates the refractive index of a layer right behind the beam expander lens 22a and indicates that there is an air space with a refractive index of 1 right behind the beam expander lens 22a in the present practical example. Similar specifications are also displayed for Nos. 3-17.

Figure 7:
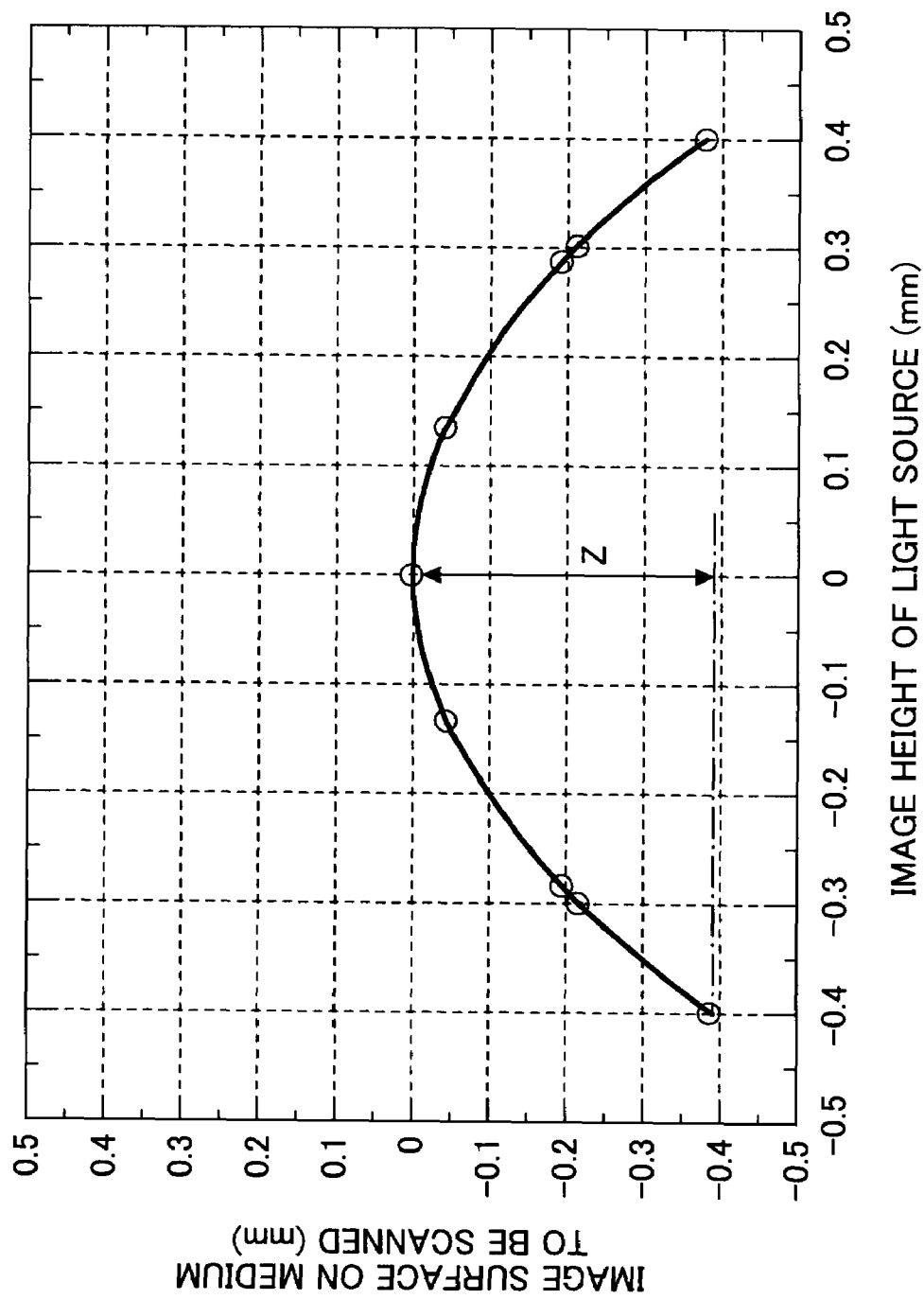
FIG. 7 is a characteristic diagram illustrating the amount of an image surface deviation on a medium to be scanned which is caused by the optical systems illustrated in FIG. 6.

FIG. 7 illustrates the characteristic of an image surface deviation on a medium to be scanned for the second and third optical systems in the above-described configuration of FIG. 6 except an image surface deviation associated with the image height of a light source for only the first optical system (the collimator lens 9 in the present practical example). The horizontal axis of FIG. 7 indicates the image height of a light source wherein an image height of light source of 0 mm indicates the optical axis of a light source. The vertical axis indicates its image height on a medium to be scanned wherein an image height on medium to be scanned of 0 mm indicates the surface of a medium to be scanned.

In the present practical example, 40 light-emitting elements are arranged in a line wherein a light source with an image height of light source of ±0.4 mm is used. As seen from the figure, the amount of the image surface deviation on medium to be scanned gradually increases toward a minus direction with increasing the positional distance of a light-emitting element from the optical axis thereof (the image height of light source=0 mm) and the amount Z of the image surface deviation of a light-emitting element at 0.4 mm from the optical axis is just about −0.4 mm relative to that of a light-emitting element present on the optical axis.

The present practical example is characterized in that an optical system is provided by measuring and storing the characteristic of FIG. 7 and providing a characteristic of a first optical system such that an image surface is deviated toward a direction opposite to that of the characteristic of FIG. 7 (a plus direction in the present practical example), by a nearly same amount as the image surface deviation of FIG. 7.

Figure 8:
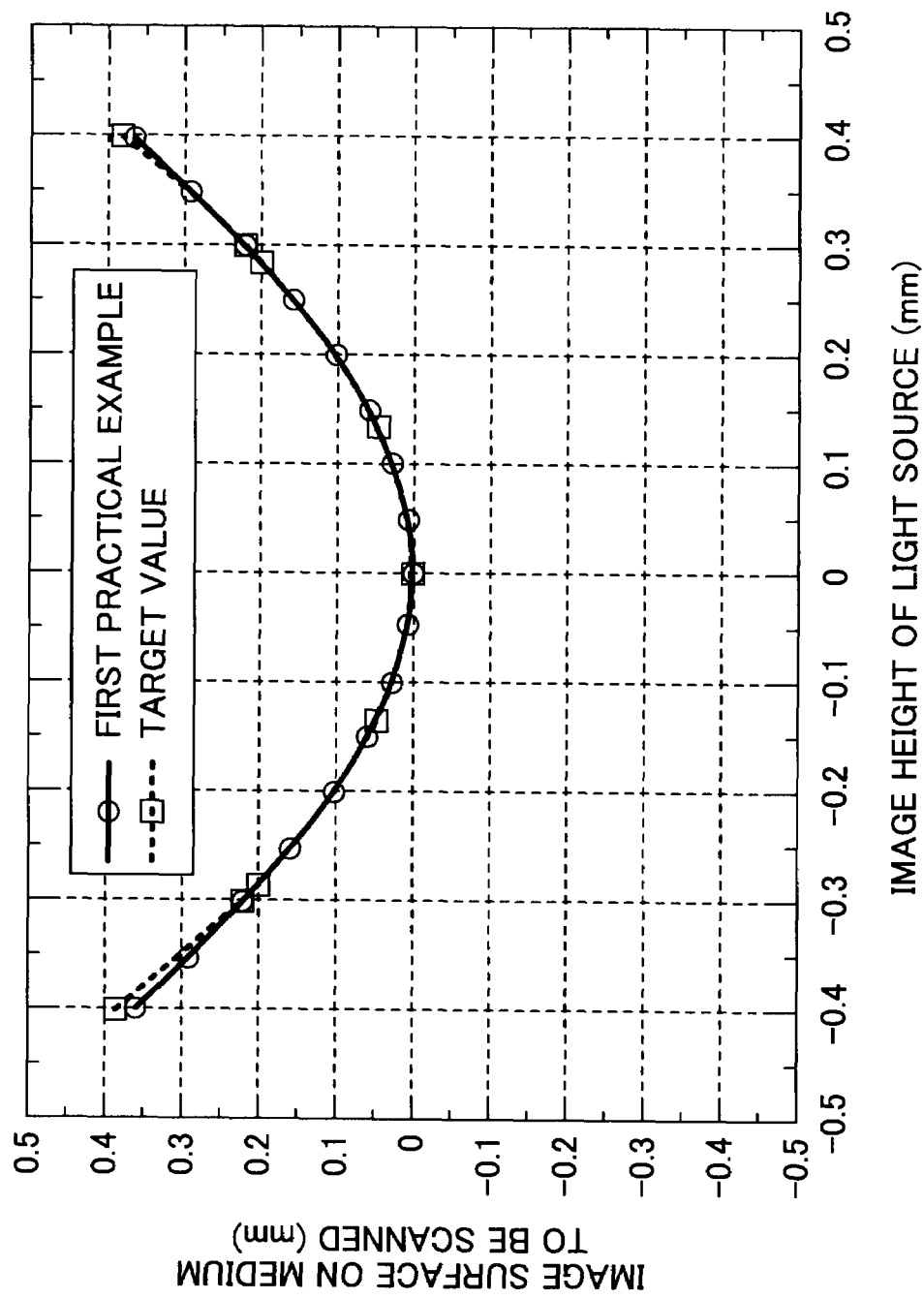
FIG. 8 is diagram illustrating a target value for a first optical system and a characteristic of the first embodiment.
Figure 11:
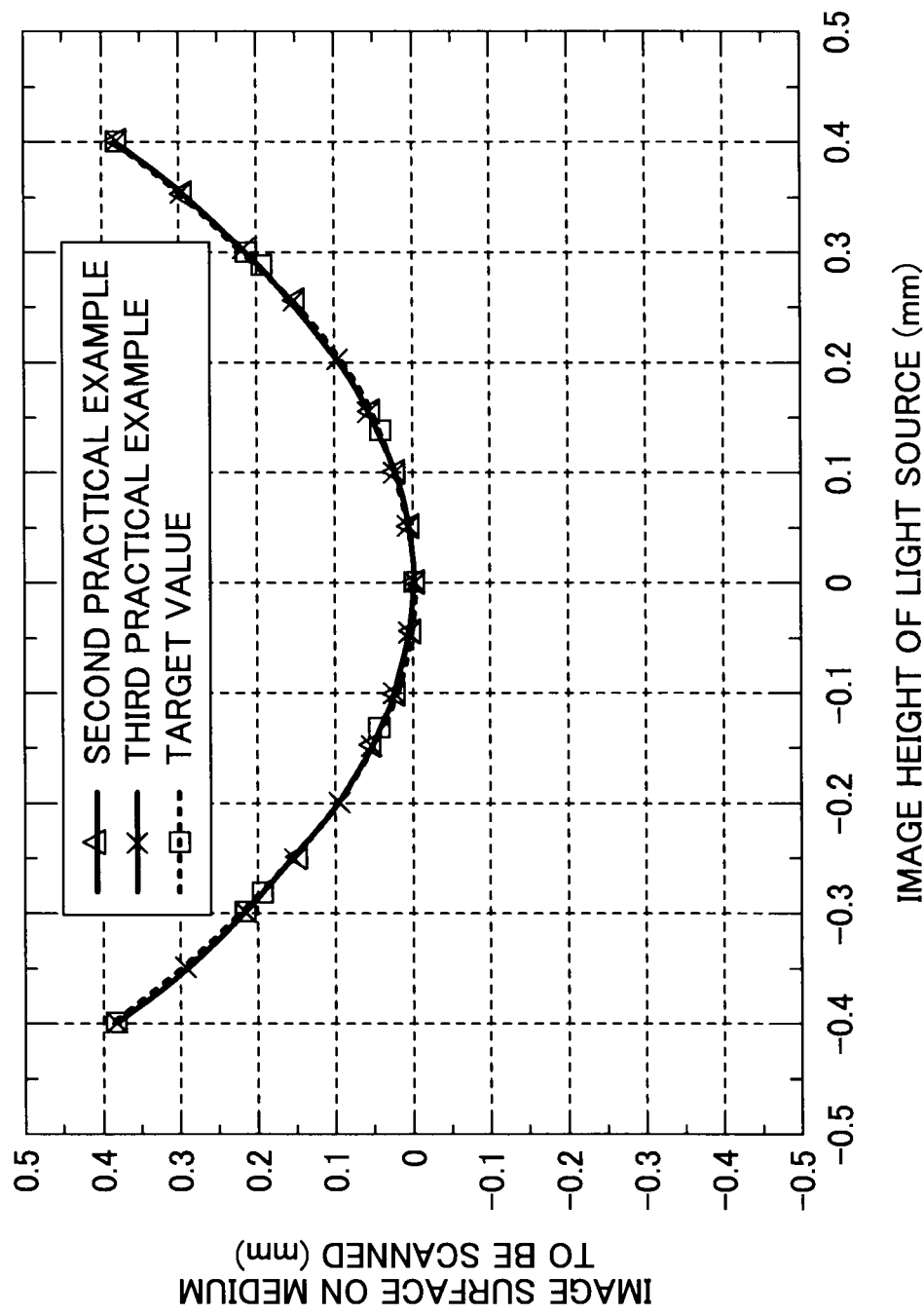
FIG. 11 is a diagram illustrating characteristic examples of image surface deviations in the second and third embodiments.

The calculations of its target characteristic are indicated by dotted lines in FIG. 8 and FIG. 11, and there are provided characteristics such that an image surface is deviated toward a direction opposite to the characteristic of FIG. 7 by a nearly same amount as the image surface deviation of FIG. 7.

FIG. 1 illustrates an enlarged cross-sectional view of a collimator lens 9 according to the first practical example of the present invention. The collimator lens 9 is composed of a single, aspheric and glass lens whose numerical aperture NA is 0.077. This is because when mounted on the second and third optical systems of FIG. 6, the value ($\lambda$RMS) of a wave front aberration is 0.07 or less which is considered a standard for a commonly good value. Even for an optical scanning system that is not exactly the same as the optical system illustrated in FIG. 6, if its structure is generally identical, it may be possible to make the value of $\lambda$RMS on a medium to be scanned be about 0.07 or less by making the numerical aperture NA of the first optical system be 0.08 or less.

The numerical aperture NA of the collimator lens 9 illustrated in FIG. 1 is 0.077 and the $\lambda$RMS is its minimum and has a characteristic close to the target characteristic of FIG. 8.

The refractive index of a lens according to the present practical example is 1.689 and the shape of the lens is such that the radius of curvature r=21.4 mm and conic constant k=14 of a first surface (at a light source side) and the radius of curvature r=−23.94 mm and conic constant k=−28 of a second surface (at an exit side) are provided.

Figure 9:
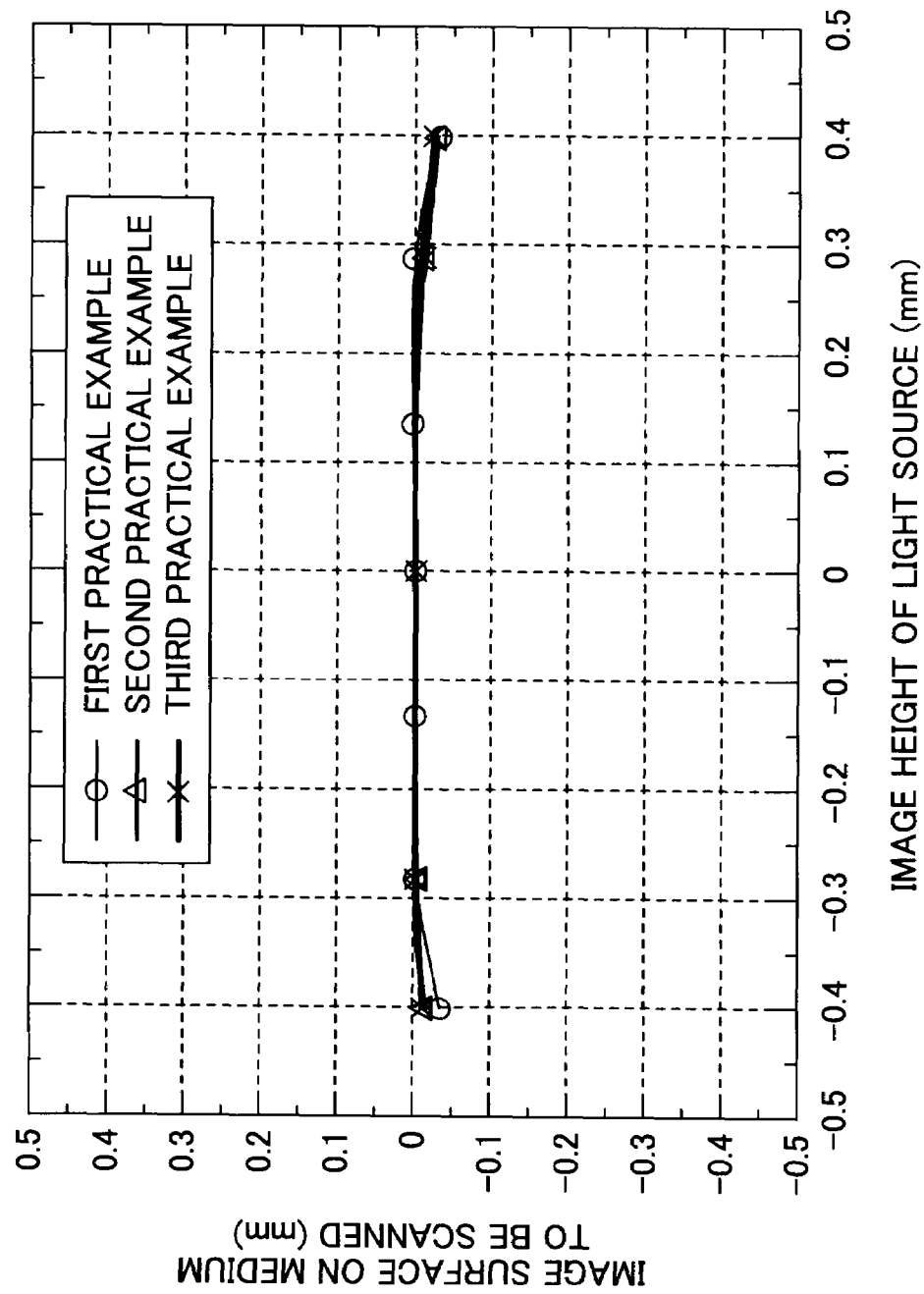
FIG. 9 is a diagram illustrating the characteristics of a spot at a scanning center in a main-scanning direction in the case where the first optical system is combined with the second and third optical systems in the first, second, and third embodiments.

FIG. 8 illustrates the characteristic of an image surface deviation in this case as a first practical example. In addition, when the collimator lens 9 is used and combined with the optical scanning system illustrated in FIG. 6, the characteristic of an image surface deviation at the center of scanning is a flat characteristic like a first practical example of FIG. 9. When the collimator lens 9 is used, it may be possible to realize an optical scanning device with almost no image surface deviation even if a light-emitting element is about ±0.4 mm from the optical axis thereof as illustrated in FIG. 9. Additionally, the value of $\lambda$RMS in the case of the single collimator lens in the first practical example is 0.0129 at a maximum and $\lambda$RMS in the case of its combination with the optical scanning system illustrated in FIG. 6 is 0.07 or less.

Furthermore, an aspheric shape is defined as a formula 4:

$$Z = c \times h \times h / \{1 + [1 - (k+1) \times c \times c \times h \times h]^{0.5}\} \qquad \text{(formula 4)},$$

wherein c=1/r, r is a radius of curvature, h is an image height, and k is a conic constant.

Figure 10:
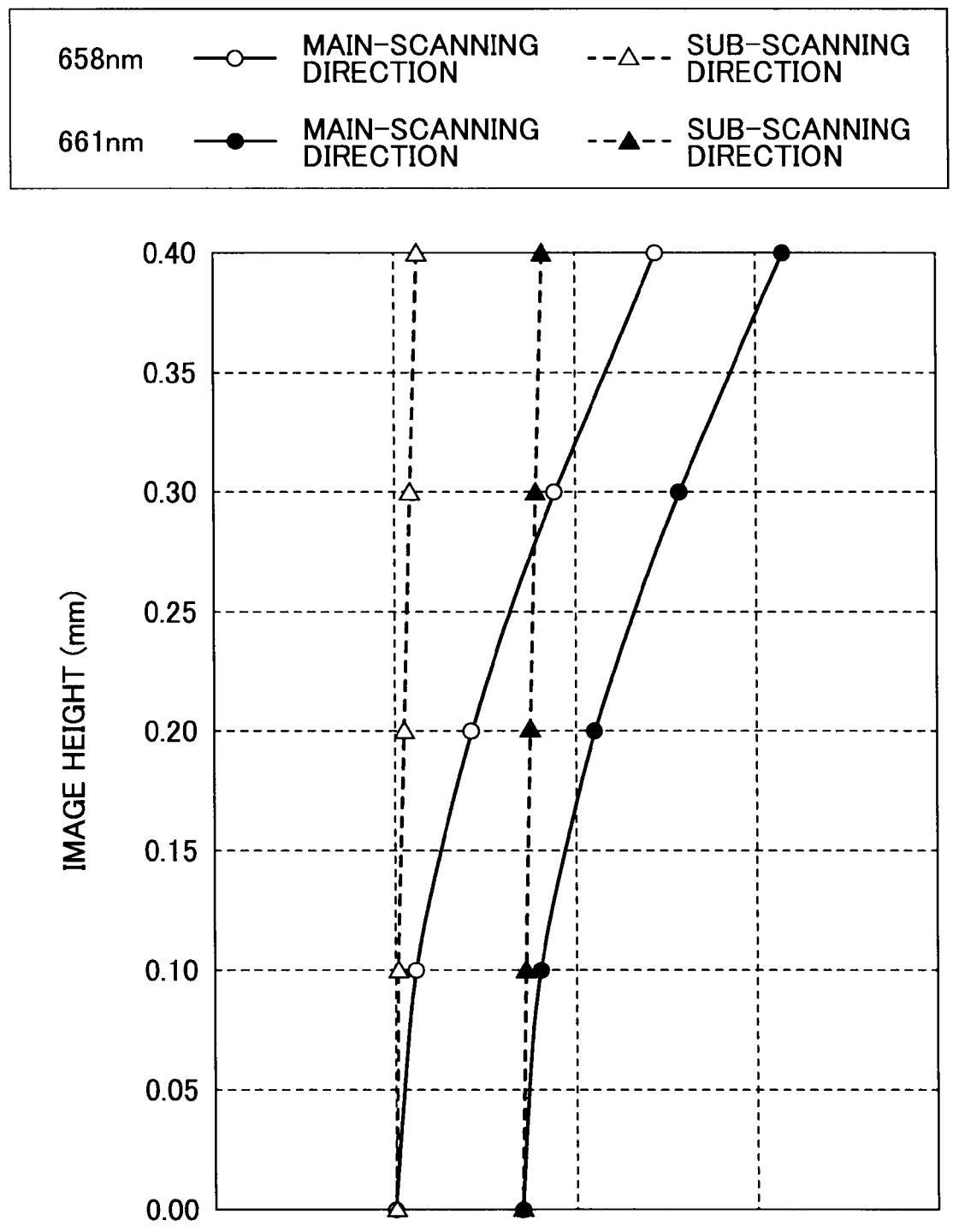
FIG. 10 is a characteristic diagram of the image surface deviations of a collimator lens according to the first embodiment.

FIG. 10 illustrates the characteristics of image surface deviations of the collimator lens 9 according to the first practical example. This figure illustrates the characteristics of an image height and an image surface deviation at the position of the collimator lens with respect to wavelengths of 658 nm (reference wavelength of a light source) and 661 nm (the maximum value of the wavelength deviation of the light source) in the main-scanning direction and the sub-scanning direction. The difference of image surfaces at an image height of 0 and each image height is nearly identical even for different wavelengths. Because an image surface is deviated by a nearly the same amount as the characteristic of the image surface on the medium to be scanned in FIG. 7, correction to a plus side is conducted while the associated magnification of an image surface in the main-scanning direction is taken into consideration. FIG. 8 illustrates the characteristic of an image surface deviation on a medium to be scanned in this case.

Second Practical Example

Figure 12:
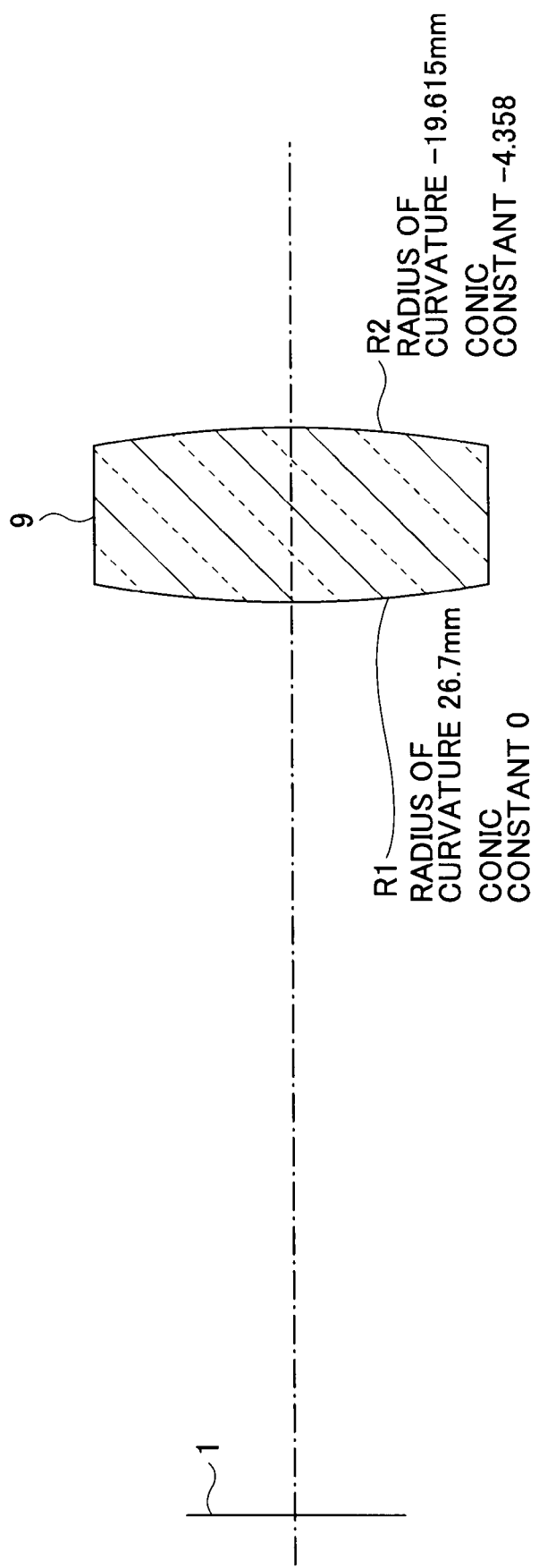
FIG. 12 is an enlarged cross-sectional diagram of a collimator lens according to the second embodiment of the present invention.

FIG. 12 illustrates an enlarged cross-sectional view of a collimator lens 9 according to a second practical example of the present invention. The collimator lens 9 according to the present practical example is composed of a single, aspheric and glass lens whose numerical aperture NA is 0.077, wherein a first surface (at a light source side) does not have an aspheric shape but is a spherical surface and only a second surface (at an exit side) has an aspheric shape. On these conditions, the $\lambda$RMS is its minimum and its characteristic is close to the target characteristic illustrated in FIG. 8.

The refractive index of the collimator lens 9 is 1.689 and the shape of the lens is such that the radius of curvature r=26.7 mm and conic constant k=0 of a first surface (at a light source side) and the radius of curvature r=−19.615 mm and conic constant k=−4.358 of a second surface (at an exit side) are provided.

FIG. 11 illustrates the characteristic of an image surface deviation in this case as a second practical example. In addition, when the first optical system is used and combined with the optical scanning system illustrated in FIG. 6, its characteristic at the center of scanning is a flat characteristic like a second practical example of FIG. 9. When the first optical system is used, it may be possible to realize an optical scanning device with almost no image surface deviation even if a light source is about ±0.4 mm from the optical axis thereof as illustrated in FIG. 9. Additionally, the value of $\lambda$RMS in the case of the single first optical system in the second practical example is 0.0163 at a maximum and $\lambda$RMS in the case of its combination with the optical scanning system illustrated in FIG. 6 is 0.07 or less.

Third Practical Example

Figure 13:
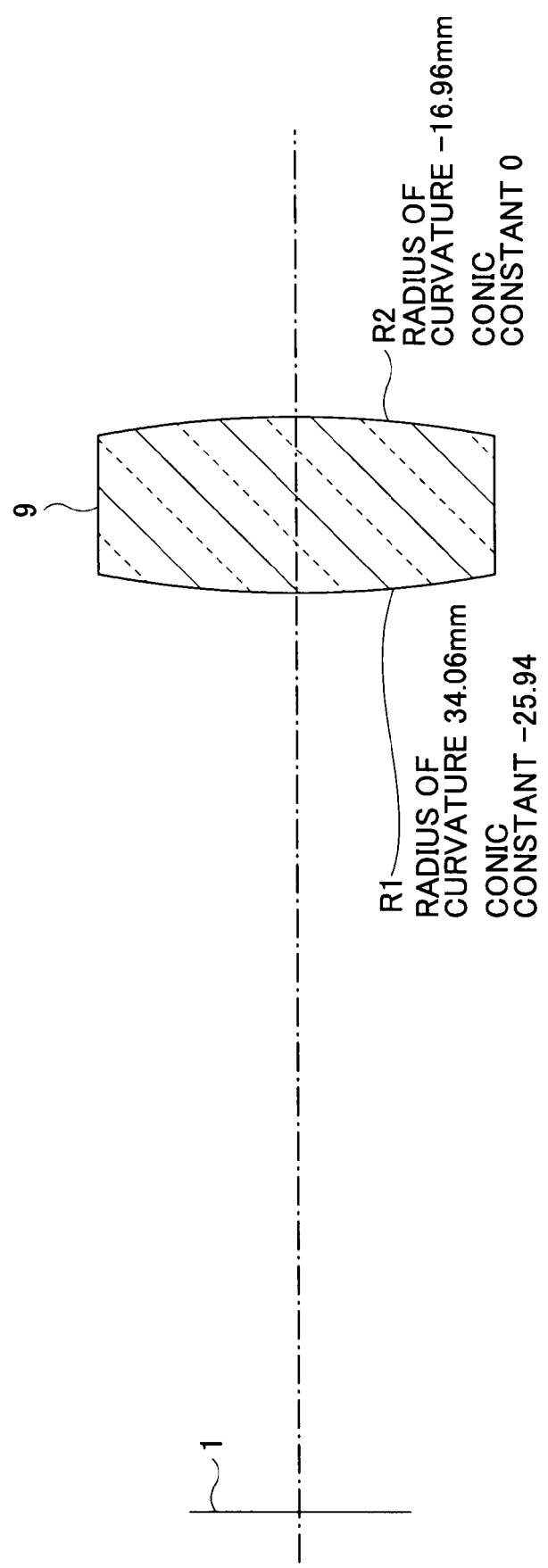
FIG. 13 is an enlarged cross-sectional diagram of a collimator lens according to the third embodiment of the present invention.

FIG. 13 illustrates an enlarged cross-sectional view of a collimator lens 9 according to a third practical example of the present invention. The collimator lens 9 according to the present practical example is composed of a single, aspheric and glass lens whose numerical aperture NA is 0.077, wherein the shape of the lens is such that an aspheric shape with a radius of curvature r=34.06 mm and conic constant k=−25.94 of a first surface (at a light source side) and a spherical surface with a radius of curvature r=−16.96 mm and conic constant k=0 of a second surface (at an exit side), which does not have an aspheric shape, are provided. On these conditions, the λRMS is its minimum and its characteristic is close to the target characteristic illustrated in FIG. 8.

FIG. 11 illustrates the characteristic of an image surface deviation in this case as a third practical example. In addition, when the first optical system is used and combined with the optical scanning system illustrated in FIG. 6, its characteristic at the center of scanning is a flat characteristic like a third practical example of FIG. 9. When the first optical system is used, it may be possible to realize an optical scanning device with almost no image surface deviation even if a light source is about ±0.4 mm from the optical axis thereof as illustrated in FIG. 9. Additionally, the value of λRMS in the case of the single first optical system in the third practical example is 0.0161 at a maximum and λRMS in the case of its combination with the optical scanning system illustrated in FIG. 6 is 0.07 or less.

As mentioned in the above-described practical example, the adjustment of an image surface deviation in the collimator lens 9 is mainly conducted by adjustment of a conic constant (s) k of the first surface (at a light source side) or/and second surface (at an exit side) of the collimator lens 9.

Figure 14:
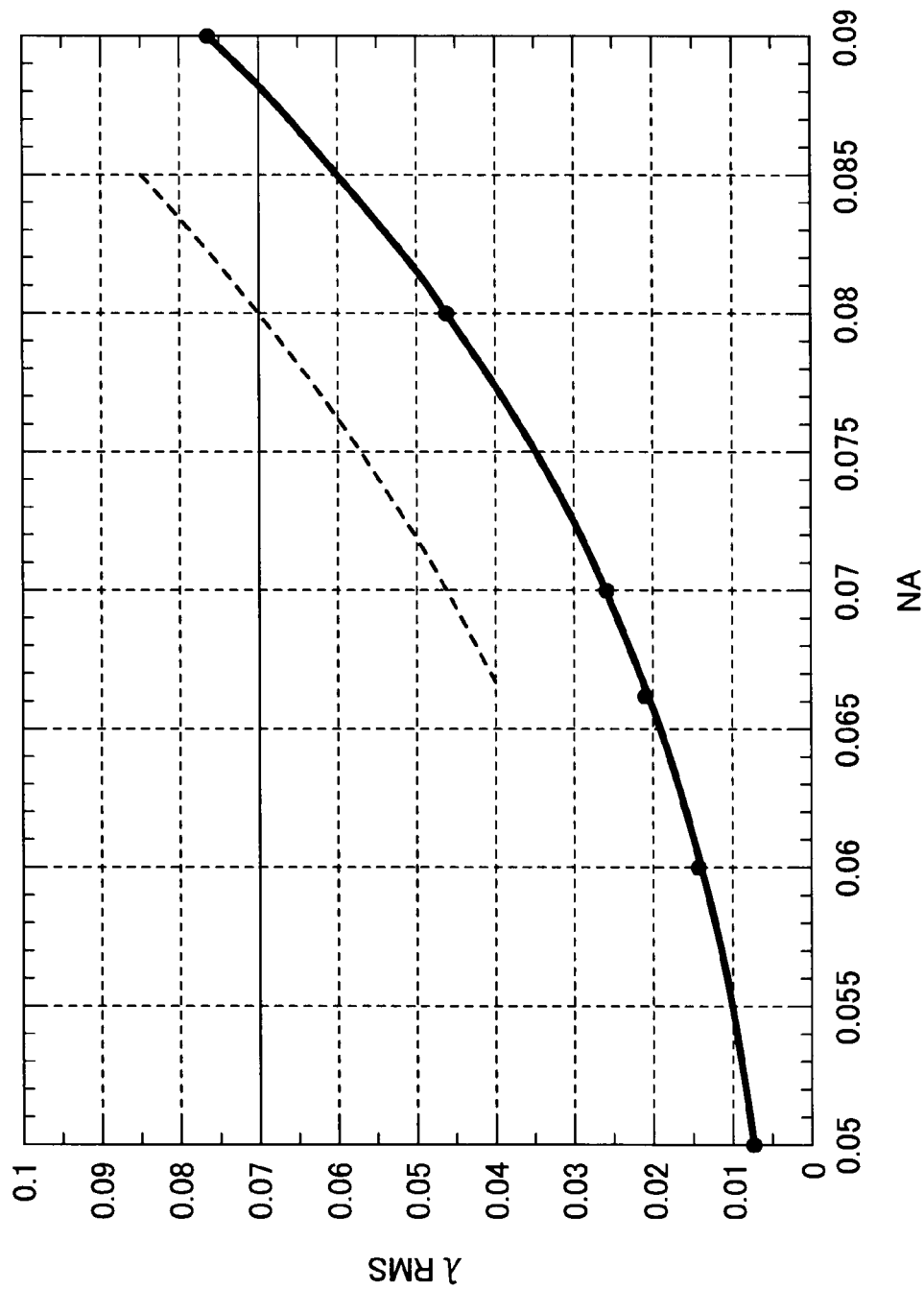
FIG. 14 is a characteristic diagram illustrating the relationship between the numerical aperture NA and a wave front aberration $\lambda$RMS of a collimator lens.

FIG. 14 is a characteristic diagram illustrating the relationship between the numerical aperture NA and wave front aberration λRMS of the collimator lens. As illustrated by a solid line in the figure, the wave front aberration λRMS also tends to have a larger value with increasing the numerical aperture NA and it may be desirable that the λRMS is controlled to be 0.07 or less for an optical property. On the other hand, because the λRMS tends to increase by about 0.02 totally due to the influence of a wavelength change or the like, as illustrated by a dotted line in the figure, it may be necessary to control the numerical aperture NA of a collimator lens to be 0.08 or less, in order to control the λRMS to be 0.07 or less while the above-mentioned increase is taken into consideration.

However, because the beam width of a light beam is small and output of light is reduced if the numerical aperture NA of a collimator lens is small, it may be necessary for the numerical aperture NA of a collimator lens to be 0.05 or more in order to conduct a desired light scanning more certainly. Therefore, it may be desirable for the numerical aperture NA of a collimator lens to be in a range of 0.05-0.08.

Figure 15:
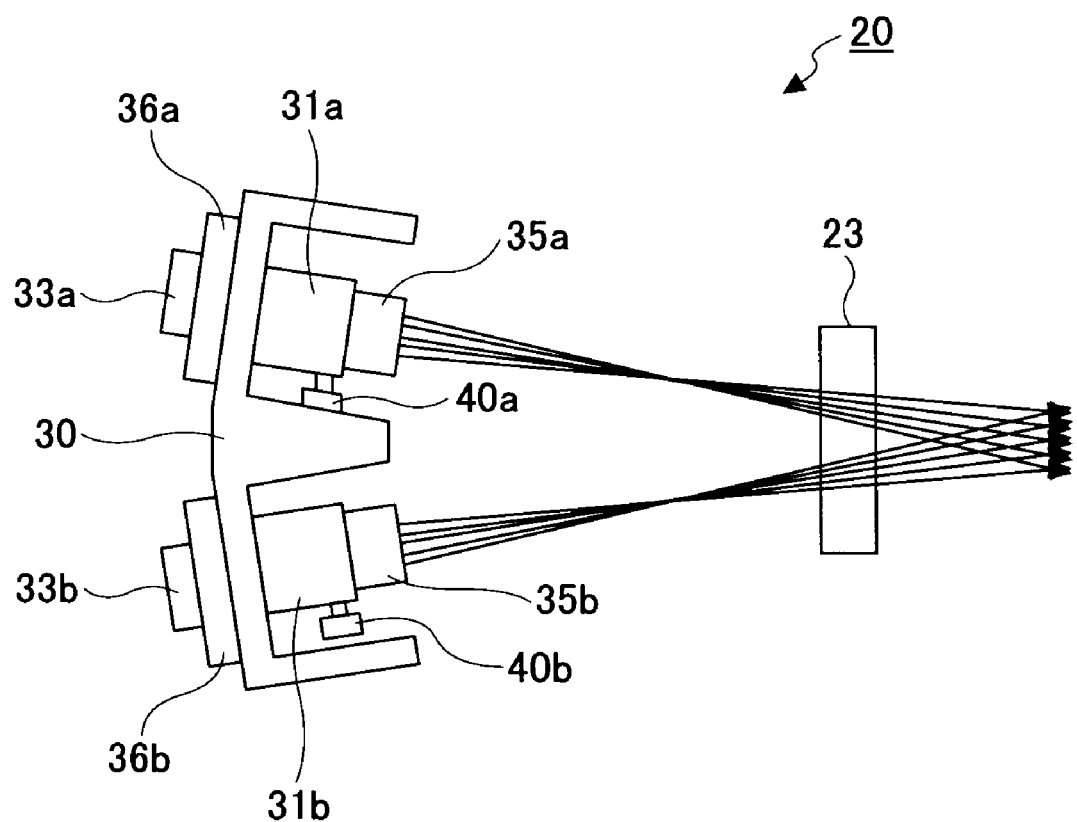
FIG. 15 is a schematic structural diagram illustrating the internal structure of a light source device according to another embodiment of the present invention.
Figure 16:
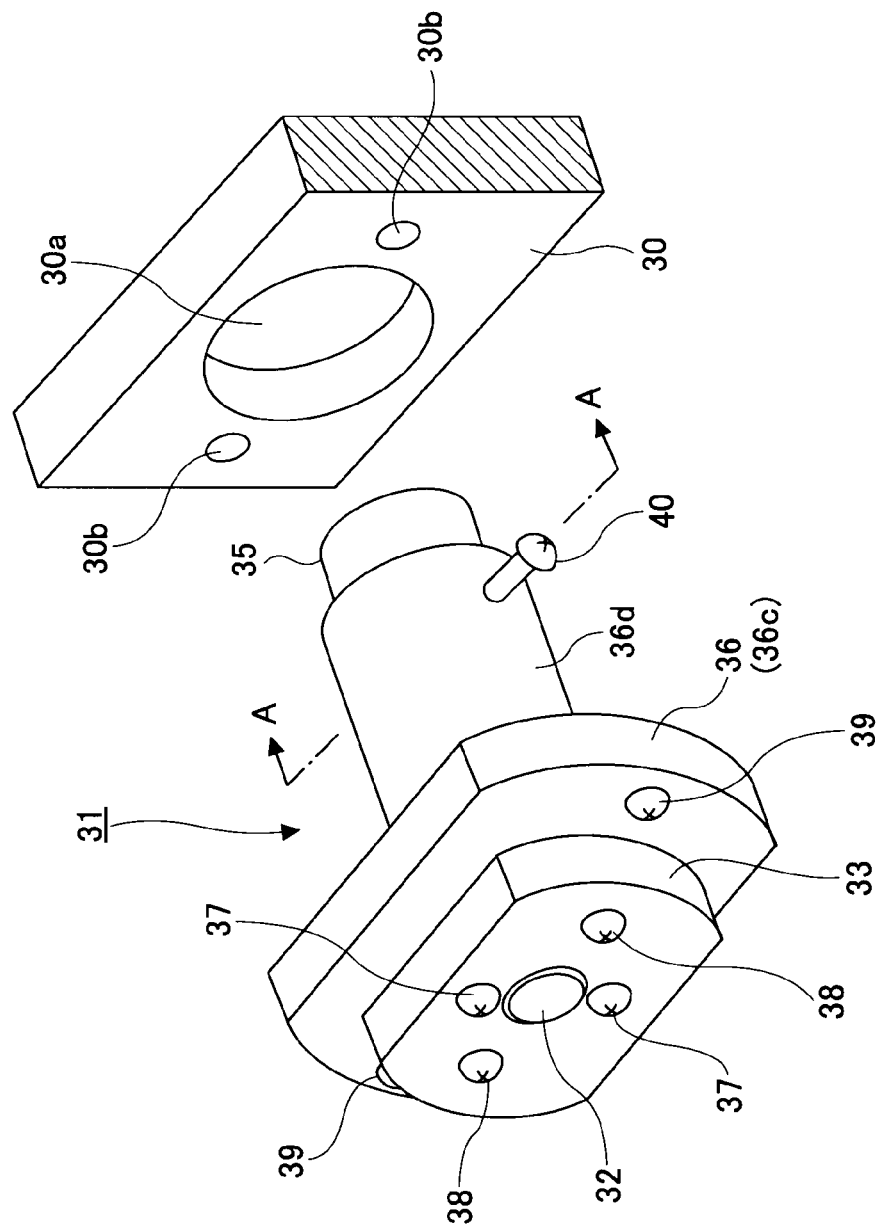
FIG. 16 is a perspective view of a light source and collimator unit used in the light source device.
Figure 17:
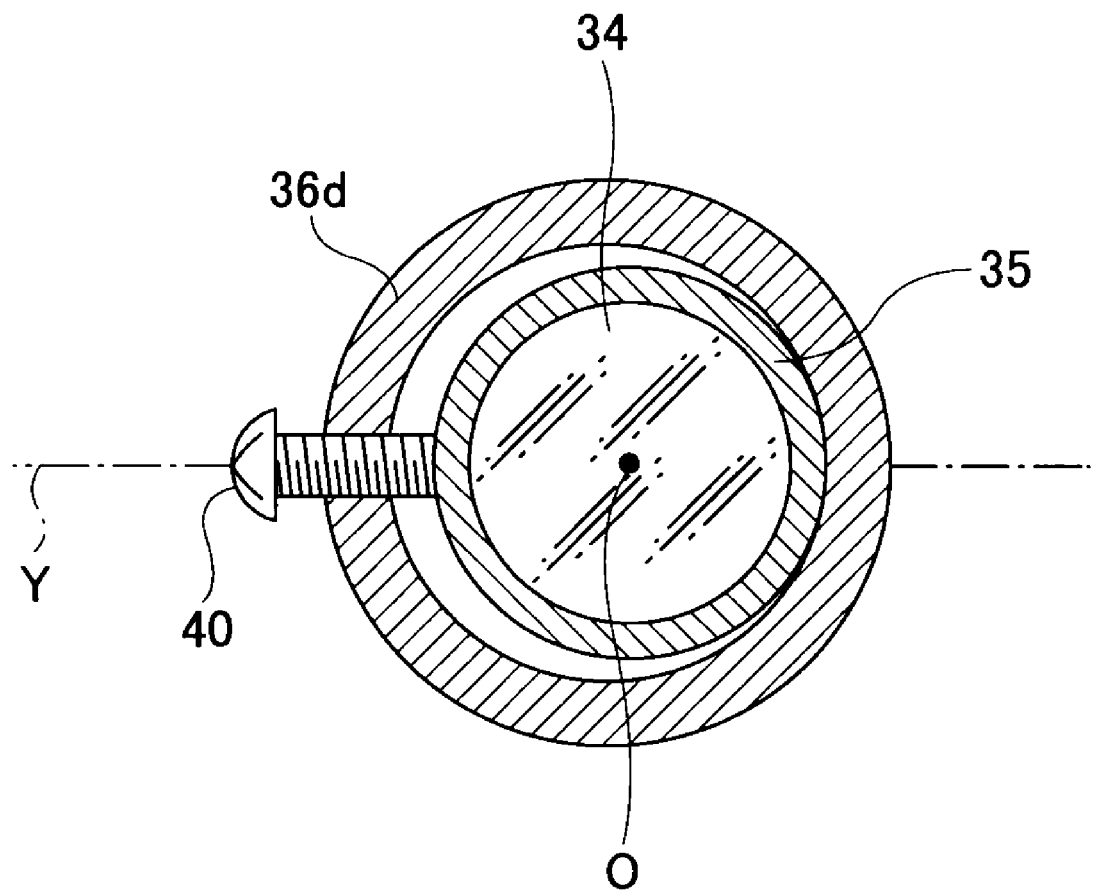
FIG. 17 is a cross-sectional diagram in line A-A of FIG. 15.
Figure 18:
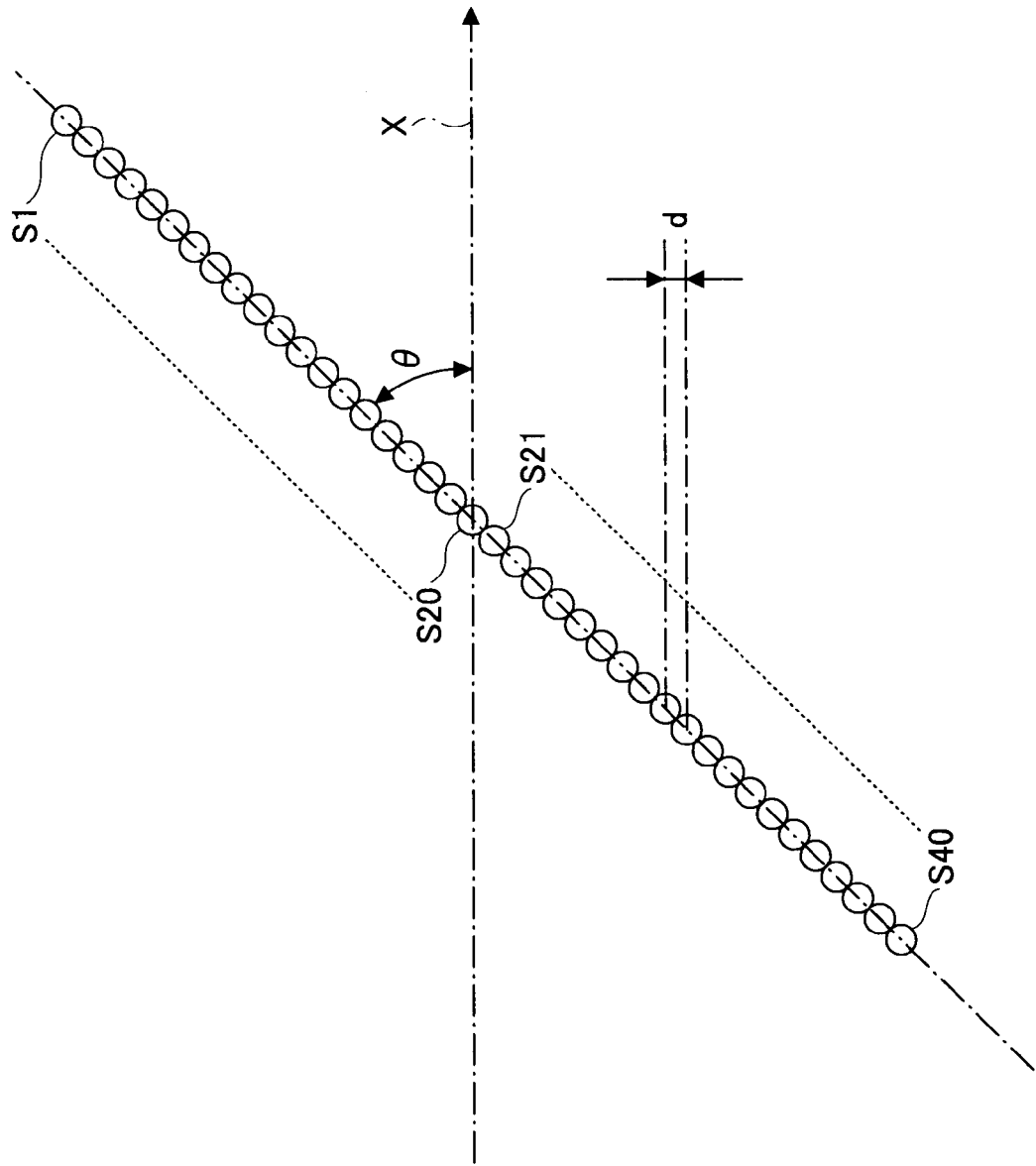
FIG. 18 is a diagram illustrating the situation where a number of light spots are arranged on a medium to be scanned in the embodiment.

FIG. 15 to FIG. 18 are diagrams illustrating a light source device in another practical example of the present invention, wherein FIG. 15 is a schematic structural diagram illustrating the internal structure of the light source device; FIG. 16 is a perspective view of a light source and collimator unit to be used in the light source device; FIG. 17 is a cross-sectional diagram in a line A-A in FIG. 16; and FIG. 18 is a diagram illustrating a situation f arrangement of beam spots on a medium to be scanned which are formed by the light source device.

As illustrated in FIG. 15, a light source device 20 is mainly composed of a base 30, a first light source and collimator unit 31a attached to the base 30, and a second light source and collimator unit 31b.

As illustrated in FIG. 16, the above-described light source and collimator unit 31 (the first light source and collimator unit 31a and the second light source and collimator unit 31b having identical structures) is mainly composed of a light source holder 33 for inserting into and holding in the inside thereof a light source 32 composed by arranging multiple light-emitting elements (20 light-emitting elements in the present practical example) in a line, a body tube 35 for inserting into and fixing in the inside thereof a collimator lens 34 for collimating light rays emitted from the light source 32, and a body tube holder 36 for attaching the above-described light source holder 33 to a flange part 36c and inserting into and attaching to a cylindrical part 36d the above-described body tube 35.

Similarly to the above-described practical example, the collimator lens 34 is an optical system in which an image surface is deviated to a direction opposite to an image surface deviation on a medium to be scanned due to a change of the image height of a light source which is cause by the second and third optical systems, by a nearly same amount as the image surface deviation.

As illustrated in FIG. 16, the light source 32 is inserted into a cylindrical containment part provided at the central part of the light source holder 33 and fixed on the light source holder 33 by means of the heads of plural screws 37. The light source holder 33 is fixed on the flange part 36c of the body tube holder 36 by means of screws 38.

As illustrated in FIG. 16, after a cylindrical part 36d of the body tube holder 36 is inserted into a circular aperture part 30a formed on the base 30 and rotationally adjusted around the optical axis of the light source 32 as a central axis, plural screws 39 inserted from the flange part 36c are engaged with and inserted into screw holes 30b of the base 30, whereby the light source and collimator unit 31 is fixed on the base 30 as illustrated in FIG. 15.

Then, as illustrated in FIG. 16 and FIG. 17, the body tube 35 that is inserted into the cylindrical part 36d of the body tube holder 36 and moved and adjusted in the direction of the optical axis is pressurized against and fixed on the inner surface of the cylindrical part 36d by one screw 40 engaged and inserted so as to penetrate through a peripheral wall of the cylindrical part 36d. The arrangement position of this screw 40 is specified in a light scanning plane of the optical scanning device 11 (see FIG. 3) and at a position orthogonal to the optical axis O of the collimator lens 34, and therefore, the pressure caused by the screw 40 acts in a Y direction orthogonal to the optical axis O.

As illustrated in FIG. 15, the first light source and collimator unit 31a and the second light source and collimator unit 31b are attached to the base 30 so as to orient to a slightly inner side of each other. Accordingly, 20 parallel light rays emitted from each light-emitting element of the first light source and collimator unit 31a and 20 parallel light rays emitted from each light-emitting element of the second light source and collimator unit 31b once intersect, subsequently travel with increasing the spaces between them, pass through the cylindrical lens 23, and are combined.

FIG. 18 is a diagram illustrating a situation of arrangement of beam spots on a medium to be scanned in the present practical example, wherein a line of spots S1-S20 formed by 20 light rays emitted from each light-emitting element of the light source and collimator unit 31a and a line of spots S21-S40 formed by 20 light rays emitted from each light-emitting element of the light source and collimator unit 31b are inclined at an arrangement angle θ with respect to the main-scanning direction and arranged in a straight line in order to adjust a scanning interval d. The scanning interval d is adjusted.

Although the illustrative embodiments and specific examples of the present invention have been described above with reference to the accompanying drawings, the present invention is not limited to any of the illustrative embodiments and specific examples and the illustrative embodiments and specific examples may be altered, modified, or combined without departing from the scope of the present invention.

The present application claims the benefit of its priority based on Japanese Patent Application No. 2008-163549 filed on Jun. 23, 2008 in Japan, the entire contents of which are hereby incorporated by reference herein.

What is claimed is:

1. An optical scanning device, comprising:
   a light source including multiple light-emitting elements, the multiple light-emitting elements being arranged in a linear manner;
   a collimator lens configured to collimate a light beam from the light source;
   a light-deflecting device configured to deflect a light beam having passed through the collimator lens to a medium to be scanned and configured to scan the medium to be scanned with the light beam; and
   a rear optical system arranged in an optical path between the collimator lens and the medium to be scanned,
   wherein the collimator lens is configured to deviate an image surface in a direction opposite to an image surface deviation on the medium to be scanned by a substantially same amount as the image surface deviation, the image surface deviation being caused by a change of an image height of the light source, and the change of the image height being caused by the rear optical system, and
   wherein a position of the collimator lens relative to a position of the light source along an optical axis of the collimator lens is fixed such that an adjustment of an image surface deviation in the collimator lens is conducted by an adjustment of a conic constant of a front surface of the collimator lens at a light source side or a back surface of the collimator lens at a light exit side.

2. The optical scanning device as claimed in claim 1, wherein the rear optical system comprises:
   a shaping optical system arranged in an optical path between the collimator lens and the light-deflecting device and configured to shape a light beam collimated by the collimator lens; and
   an imaging optical system arranged in an optical path between the light-deflecting device and the medium to be scanned and configured to image a light beam deflected by the light-deflecting device onto the medium to be scanned.

3. The optical scanning device as claimed in claim 1, wherein a numerical aperture of the collimator lens is 0.08 or less.

4. The optical scanning device as claimed in claim 1, wherein the light source is rotatable around an optical axis of the light source and a scanning interval of a light ray is adjusted by rotation of the light source.

5. An image forming apparatus comprising:
   a photoconductor body;
   a charging device configured to charge the photoconductor body;
   an optical scanning device configured to scan the photoconductor body with a light ray and form an electrostatic latent image on the photoconductor body, the electrostatic latent image corresponding to image information to be recorded;
   a development device configured to provide a toner to the electrostatic latent image to form a toner image;
   a transfer device configured to transfer the toner image onto the medium to be recorded; and
   a fixation device configured to fix the transferred toner image on the medium to be recorded,
   wherein the optical scanning device is the optical scanning device as claimed in claim 1.

6. The optical scanning device as claimed in claim 1, wherein
   the collimator lens is mounted in a body tube mounted in a body tube holder,
   the light source is mounted in a light source holder, and
   the body tube holder and the light source holder are integrated with each other.

7. The optical scanning device as claimed in claim 1, wherein the front surface has a spherical shape.

8. The optical scanning device as claimed in claim 1, wherein the back surface has an aspherical shape.

* * * * *